United States Patent
Aoki et al.

(10) Patent No.: US 6,745,947 B2
(45) Date of Patent: Jun. 8, 2004

(54) VEHICLE AIR CONDITIONER WITH AUTOMATIC AIR-CONDITIONING CONTROL

(75) Inventors: Shinji Aoki, Chiryu (JP); Akihisa Izuhara, Nishio (JP); Yuji Honda, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/351,199

(22) Filed: Jan. 23, 2003

(65) Prior Publication Data

US 2003/0136854 A1 Jul. 24, 2003

(30) Foreign Application Priority Data

Jan. 24, 2002 (JP) ........................... 2002-015694

(51) Int. Cl.$^7$ .............................. F28F 13/00; F24F 7/00
(52) U.S. Cl. ..................... 236/49.3; 236/91 C; 165/270
(58) Field of Search ................ 236/91 C, 493; 454/75, 258; 165/270; 62/158

(56) References Cited

U.S. PATENT DOCUMENTS 6,170,274 B1 * 1/2001 Ichishi et al. ............... 236/49.3
6,488,213 B2 * 12/2002 Ohga et al.
2002/0125332 A1   9/2002 Aoki et al. ................. 236/49.3

FOREIGN PATENT DOCUMENTS

JP   56-64611    6/1981 ............ G01C/1/00
JP   4-138910    5/1992 ............ B60H/1/00

OTHER PUBLICATIONS

Serial. # 10/266,663.*
*Journal of Nippondenso Technical Disclosure* No. 107–040, published Mar. 15, 1996.

* cited by examiner

Primary Examiner—William Wayner
(74) Attorney, Agent, or Firm—Harness, Dickey & Pierce, PLC

(57) ABSTRACT

A vehicle air conditioner controls the air-conditioning automatically based on sensors detecting environmental conditions regarding the air-conditioning of a vehicle and based on an operational portion operable by a passenger. One of the sensors is a sunlight sensor for detecting the amount of sunlight incident into the vehicle. A signal detected by the sunlight sensor is modified to have a time constant by a time constant process. The modification is based on the elevation angle of the sunlight and the inside air temperature of the vehicle. The modified signal is used for automatic control of the air-conditioning.

9 Claims, 3 Drawing Sheets

VEHICLE AIR CONDITIONER WITH AUTOMATIC AIR-CONDITIONING CONTROL

CROSS REFERENCE TO RELATED APPLICATION

This application is based upon Japanese Patent Application No. 2002-15694, filed on Jan. 24, 2002, the contents of which are incorporated herein by reference.

BACKGROUND OF THE INVENTION

1. Field of the Invention

The present invention relates to a vehicle air conditioner which has an automatic air-conditioning control function.

2. Related Art

An air conditioner, such as the one described above, uses a calculated value of a signal from a sunlight sensor for automatic control of the air-conditioning. The calculated value is obtained by a time constant process in which a detected value (pure value) from the sunlight sensor is modified to have a time constant. The time constant process is performed due to the following reasons.

When the vehicle travels along a valley between tall buildings on a sunny day, the sunlight incident into the vehicle is intermittent so that the detected value at the sunlight sensor varies dynamically so as to make the control of the air-conditioning unstable. Therefore, the time constant process is used to prevent the unstable condition of the automatic control of the air-conditioning by using the modified detected value of the sunlight sensor in the automatic control of the air-conditioning.

The time constant process is performed so that the calculated value (output value) is changed exponentially with respect to time when the detected value (pure value) changes. A time constant can be denoted the time (second) until change in the calculated value reaches a value of, for example, 63.2% with respect to change in the detected value of the sunlight sensor. When the time constant is large, the change in the calculated value is moderated with respect to change in the detected value.

In a laid-open patent application publication JP-A-H04-138910, the time constant process for the detected value by the sunlight sensor is performed in connection with change in an elevation angle of the sunlight incident into the vehicle in the automatic controllable air conditioner.

In a technical disclosure of DENSO CORPORATION No. 107, which was published on Mar. 15, 1996, the time constant process for the detected value by the sunlight sensor is performed in connection with the elevation angle of the sunlight incident into the vehicle and an outside air temperature of the vehicle.

The temperature feeling of the passenger, which is the feeling of the passenger indicating how much he/she feels the temperature, is changed in accordance with (1) the stream of air inside the vehicle, (2) the radiation of the sunlight or the like and (3) an environmental temperature of the passenger (inside air temperature).

A degree in time-rate change of the temperature feeling of the passenger changes in relation to the inside air temperature even if the radiation of the sunlight is in the same condition. The above-described prior arts do not take into consideration the fact that the inside air temperature influences the temperature feeling of the passenger. Therefore, in the conventional arts, a difference occurs between the control of the air-conditioning by the calculated value after the time constant process and the actual change in the temperature feeling of the passenger. As a result, the air-conditioning cannot follow the actual change in the temperature feeling of the passenger. More specifically, the control of a blow-out temperature of the conditioned air to be supplied to a passenger compartment or a blow-out mode to supply the conditioned air to the passenger compartment differs from the actual change in the temperature feeling of the passenger so as to make the air-conditioning uncomfortable or strange for the passenger.

Although the time constant is changed in connection with the outside air temperature in the latter prior art described above, it influences the heat load of the whole air-conditioning of the of the vehicle, but does not influence the temperature feeling of the passenger directly. Therefore, it still causes the difference between the actual change in the temperature feeling of the passenger and the control of the air-conditioning by the calculated value after the time constant process.

SUMMARY OF THE INVENTION

An object of the invention is to provide an improved vehicle air conditioner that performs air-conditioning following an actual change in a temperature feeling of a passenger that is influenced by an inside temperature in a vehicle so as to be comfortable for the passenger.

According to an aspect of the present invention, the air conditioner has time constant process means for performing a time constant process taking in consideration the inside temperature, which denotes a temperature inside the vehicle such as a temperature of the air inside the vehicle, as well as an elevation angle of the sunlight incident into the vehicle in an automatic air-conditioning control.

With this feature, the air conditioner can determine a time constant which matches the actual change in the temperature feeling of the passenger since it is determined using the inside temperature as well as the elevation angle of the sunlight. This is because a degree (speed) in time-rate change of the change in the temperature feeling of the passenger is influenced by not only the elevation angle of the sunlight but also the inside temperature. Therefore, the passenger can feel a comfortable air-conditioning.

The passenger feels the heat with respect to an increase of the inside temperature more sensitively. Therefore, it is preferable that the time constant is decreased in accordance with the increase of the inside temperature to meet the control of the air-conditioning with the change in the temperature feeling of the passenger more suitably.

Preferably, the time constant changes in accordance with the elevation angle of the sunlight. For example, the time constant has a minimum value at a predetermined angle of the elevation angle, and has a maximum value at another angle other than the predetermined angle of the elevation angle.

More specifically, the time constant has the minimum value at around 30° of the elevation angle since the sunlight can reach a face portion of the passenger directly at the angle so that the temperature feeling of the passenger changes speedily in a short time. In this case, the control of the air-conditioning follows a sensitive change in the temperature feeling of the passenger with a quick change in the control of the air-conditioning.

When the elevation angle increases from around 30°, it is preferable that the time constant is increased since a sunlight amount is decreased which is directly incident to the face portion of the passenger.

Preferably, a degree in increase of the time constant with respect to increase of the elevation angle of the sunlight is decreased in accordance with increase of the inside temperature. This is because a slight increase of the sunlight causes a sensitive change in the temperature feeling of the passenger at a high inside temperature such as 30° C. or more.

Other features and advantages of the present invention will become more apparent from the following detailed description made with reference to the accompanying drawings.

DETAILED DESCRIPTION OF THE PREFERRED EMBODIMENT

Figure 1:
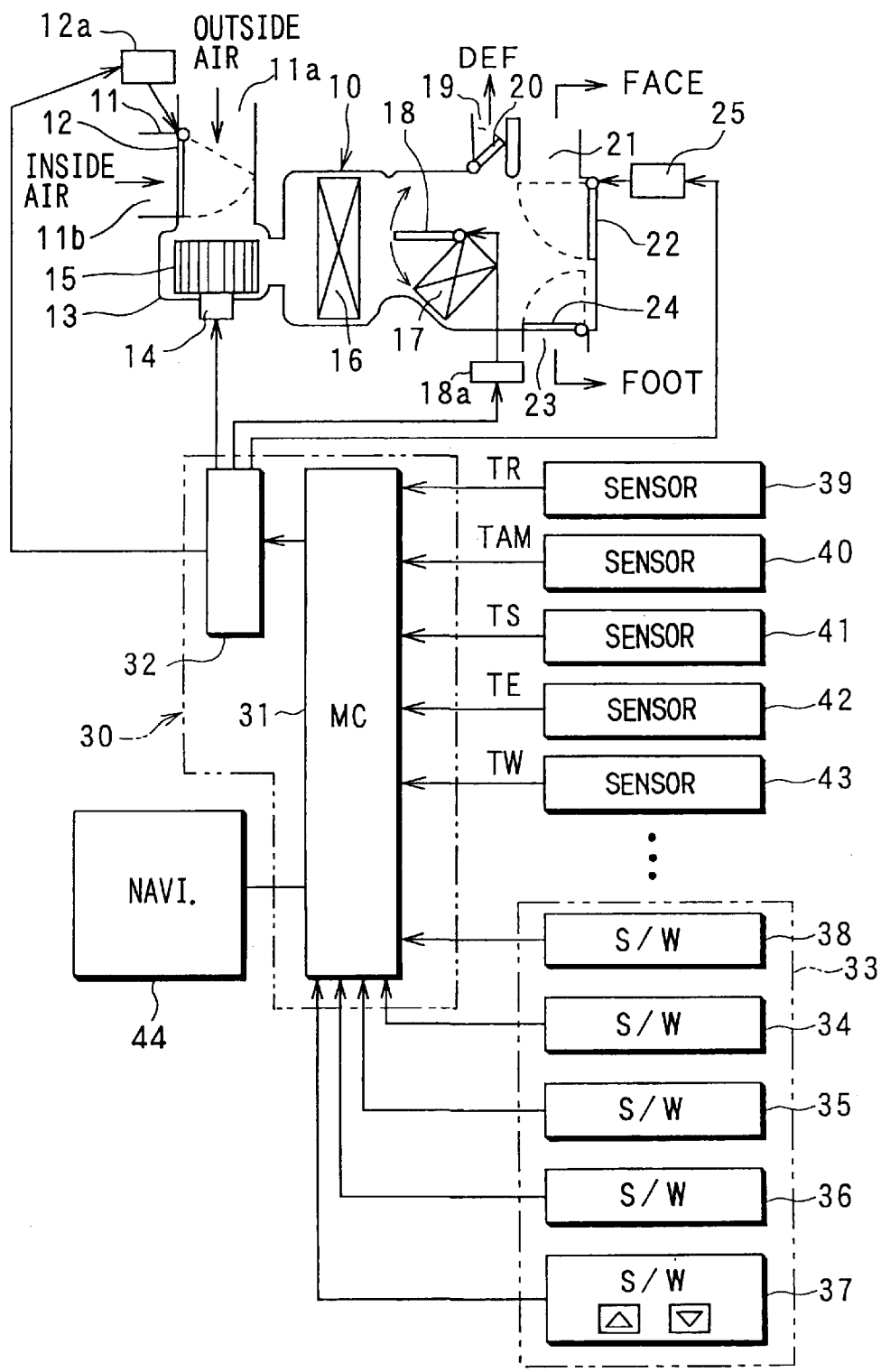
FIG. 1 is a system diagram illustrating a construction of a ventilation system of the present invention.

Specific embodiments of the present invention will now be described hereinafter with reference to the accompanying drawings in which the same or similar component parts are designated by the same or similar reference numerals.

(First Embodiment)

First, a schematic ventilation system in which air is blown toward a passenger compartment of a vehicle will be described with reference to FIG. 1. An air conditioning unit 10 has an inside/outside air switching box 11 in which an outside air inlet 11a for introducing outside air (air from the outside of the vehicle) and an inside air inlet 11b for introducing inside air (air from the passenger compartment) at the most upstream side of the air conditioning unit 10. The inside/outside air switching box 11 is provided at the most upstream end of the air conditioning unit 10.

The inside/outside air switching box 11 has an inside/outside switching door 12 rotatably disposed therein between the outside air inlet 11a and the inside air inlet 11b. The inside/outside switching door 12 is driven by an electric-drive apparatus 12a such as a servomotor. The switching door 12 opens and closes the outside air inlet 11a and the inside air inlet 11b to determine from which inlet the air should be introduced or to determine the mixing rate between the air from the outside of the vehicle and the air from the passenger compartment of the vehicle.

An air blower unit 13 is provided at a downstream side of the inside/outside air switching box 11 in the air conditioning unit 10, for blowing air to the downstream side of the air conditioning unit 10. The air blower unit 13 has a blower-driving motor 14 and a centrifugal blower fan 15 connected to a rotor shaft of the blower-driving motor 14. An evaporator 16 and a heater core 17 are arranged in the downstream side of the blower fan 15.

The evaporator 16 is a cooling heat exchanger and constitutes a refrigeration cycle with a compressor driven by an engine (not shown) and the like, for cooling air by absorbing heat from the air coming into the air conditioning unit 10 by causing evaporation of low-pressure coolant. The heater core 17 is a heating heat exchanger for heating the air using hot water (cooling water) flowing in the engine as a heat source.

An air mix door 18 is rotatably provided at an upstream side of the heater core 17. The air mix door 18 is driven by an actuator 18a to determine an opening degree thereof for adjusting the ratio between the amount of heated air passing through the heater core 17 and the amount of cooled air bypassing the heater core 17, thereby adjusting the temperature of the air blown into the passenger compartment. Namely, the heated air passing through the heater core 17 and the cooled air bypassing the heater core 17 are mixed with each other so as to produce mixed air having a temperature indicated by a passenger. Therefore, the air mix door constitutes a temperature adjusting means for the air blown into the passenger compartment.

At the most downstream end of the ventilation passage in the air conditioning unit 10, a blow-out mode switching portion is provided. More specifically, a defroster door 20 for opening and closing a defroster blow-out port 19, a face door 22 for opening and closing a face blow-out port 21 and a foot door 24 for opening and closing a foot blow-out port 23 are provided.

These doors 20, 22, 24 correspond to blow-out mode switching means, and are driven by an actuator 25 to open/close the respective blow-out ports 19, 21 and 23 to thereby determine a blow-out mode of the conditioned air, for example, a FACE mode (FACE), a BI-LEVEL mode (B/L), a FOOT mode (FOOT), a FOOT-DEF mode or a DEFROSTER mode. The conditioned air is blown into the passenger compartment from an opened port according to the blow-out mode.

An air conditioning control device 30 has a microcomputer 31 as control means. The amount of the conditioned air blown into the passenger compartment is controlled by determining the revolution speed of the blower motor 14 that is determined by the applied voltage (blower voltage) thereto. The blower voltage is adjusted in accordance with an output signal from the microcomputer 31 through a drive circuit 32. Other actuators 12a, 18a and 25 are also controlled by the drive circuit 32 based on output signals from the microcomputer 31.

The microcomputer 31 has a well-known structure including a CPU, a ROM portion, a PAM portion, a standby RAM portion, an I/O port portion, an A/D converter and the like.

Operational signals are input to the microcomputer 31 that are sent from an air conditioning operational portion 33 arranged on an instrument panel in the passenger compartment. Many kinds of switches are provided in the operational portion 33, such as an AUTO switch 34 for setting an automatic control condition of the air conditioner, an inside/outside air selecting switch 35 for manually selecting a suction mode between an inside air suction mode and an outside air suction mode, a blow-out mode selecting switch 36 for manually selecting the blow-out mode described above, a blowing air amount adjusting switch 37 for manually adjusting the amount of air blown by the fan 15, a temperature setting switch 38 for setting a preferred temperature of the passenger.

The microcomputer 31 receives sensor signals from several sensors, each of which detects an environmental condition that influences the air conditioning in the passenger compartment. More specifically, the sensors are an inside air temperature sensor 39 for detecting the temperature (TR) of air inside of the passenger compartment, an outside air temperature sensor 40 for detecting the temperature (TAM)

of air outside of the vehicle, a sunlight sensor 41 for detecting the amount of sunlight (TS) incident into the passenger compartment, an evaporator temperature sensor 42 for detecting the temperature (TE) of the evaporator (actually, the temperature of the air immediately after passing through the evaporator), a water temperature sensor 43 for detecting the temperature (TW) of the cooling water circulating in the engine and the heater core 17, and the like. The signals from those sensors are input to the microcomputer after being converted by the A/D converter.

The microcomputer 31 in the air conditioning control device 30 is coupled with a vehicle navigation system 50 to conduct communication of electrical signals between vehicle navigation system 44 and the air conditioning control device 30 with a predetermined communication protocol (for example, CAN).

As well known, the navigation system 44 has a GPS (Global Positioning System) antenna to receive radio waves emitted from plural artificial satellites for determining a position of the vehicle (latitude and longitude), a direction of travel of the vehicle or the like. The navigation system 44 informs the passenger of road information and the like using information displaying means by way of a display or voice message in association with information including the position of the vehicle, the direction of travel of the vehicle and the like, and map information recorded in a high-capacity storage medium such as a DVD and a CD-ROM. A monitor (not shown) displays a current position of the vehicle.

In this embodiment, the information regarding the position of the vehicle (latitude and longitude), a direction of travel of the vehicle or the like is input from the vehicle navigation system 44 to the microcomputer 31 in the air conditioning control device 30.

Figure 2:
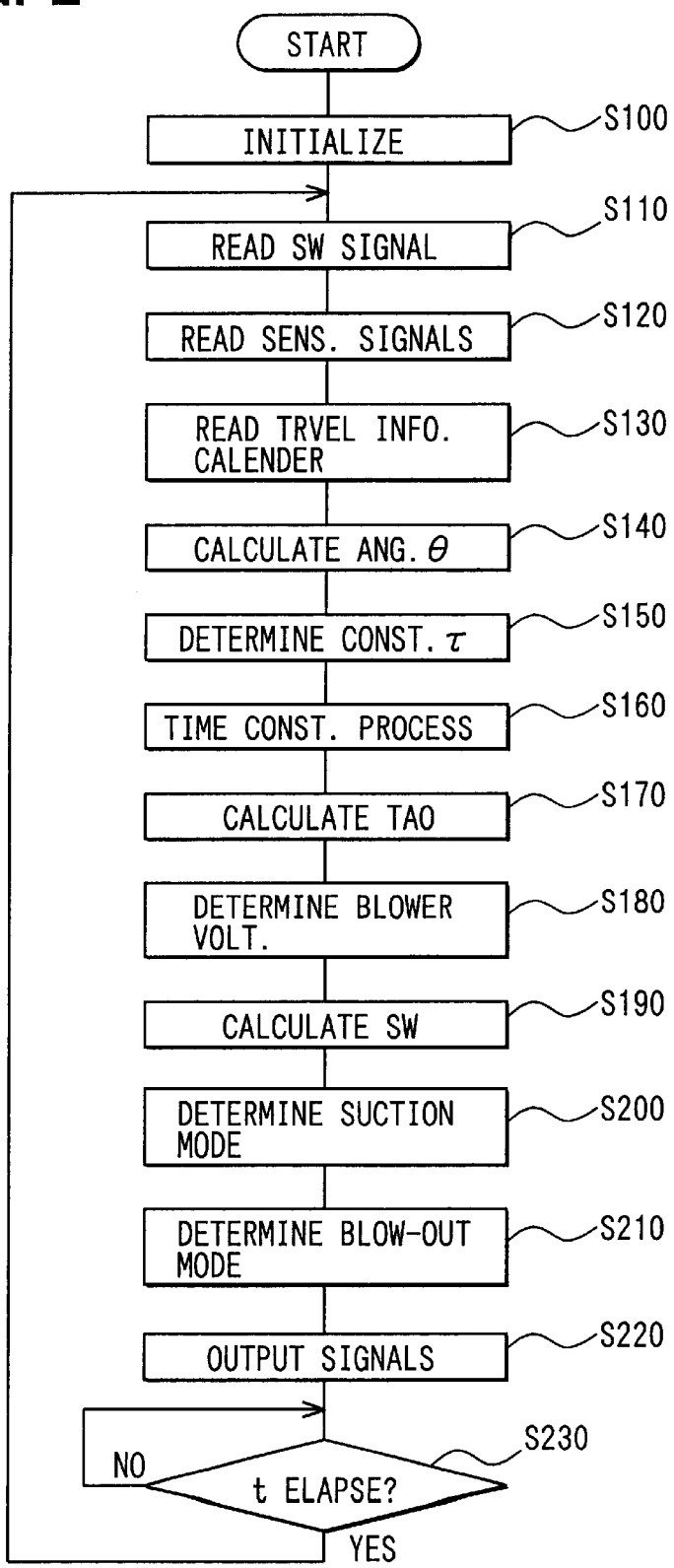
FIG. 2 is a flow chart showing an automatic air conditioning control of the present invention.

Next, a flow chart executed by the microcomputer 31 in this embodiment will be described with reference to FIG. 2. This flow chart will start by turning on the ignition IG. First of all, every conversion and setting of initial values of flags or the like are executed in step S100. Next, the microcomputer 31 reads the operational signals from the switches 34–38 of the air conditioning operational portion 33 in step S110. Also, the microcomputer 31 reads the detected signals indicative of the environmental conditions of the vehicle from the sensors 39–43 and a signal from the navigation system 50 in step S120.

In next step S130, the microcomputer 31 reads the information regarding the position of the vehicle (latitude and longitude), the direction of travel of the vehicle or the like and calendar information having date and time. In next step S140, the microcomputer 31 calculates a sun position with respect to the vehicle using the information read at step S130 to obtain an elevation angle $\theta$ of the sunlight incident into the vehicle. The elevation angle denotes an incident angle with respect to an up-down direction of the vehicle body. The calendar information can be used that is stored in the microcomputer 31 itself.

In next step S150, a time constant $\tau$, which is used in a time constant process with respect to a detected value from the sunlight sensor 41 which is read at step S120, is determined. The time constant $\tau$ is determined according to a control map shown in FIG. 3 and memorized in the ROM portion of the microcomputer 31 using the elevation angle $\theta$ of the sunlight and the inside temperature TR as parameters.

Figure 3:
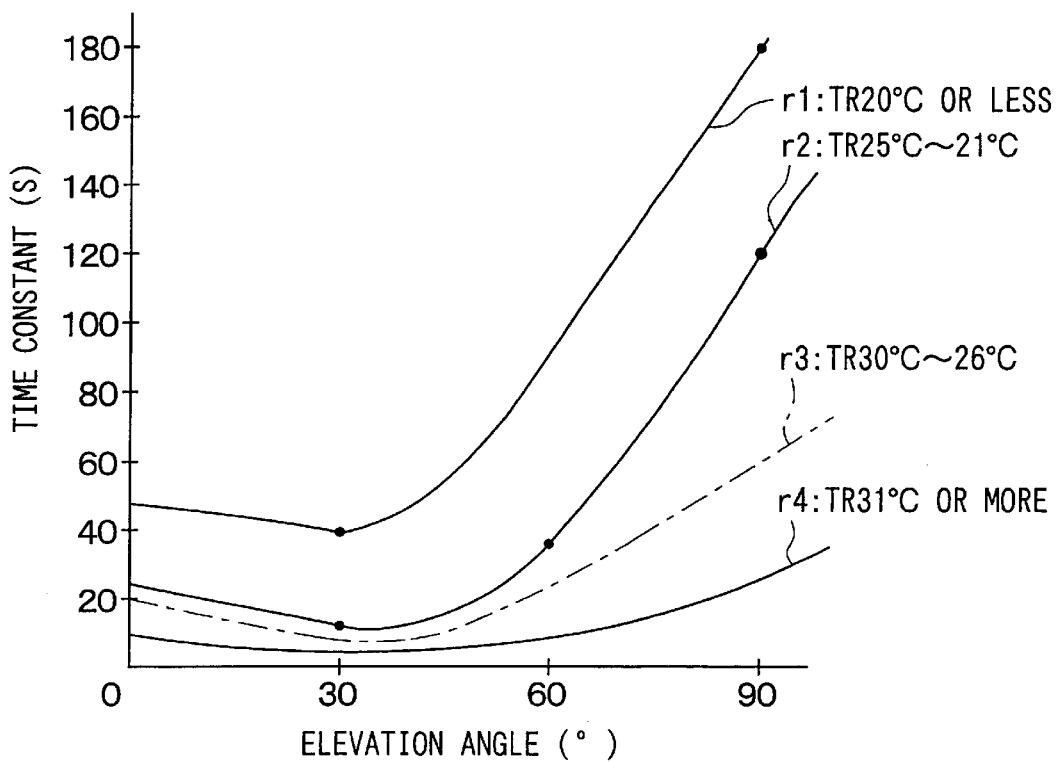
FIG. 3 is a diagram showing characteristics for determining a time constant in a time constant process in a first embodiment of the present invention.

In the control map shown in FIG. 3, the time constant $\tau$ is determined in relation to change in the elevation angle $\theta$ of the sunlight in every range of the inside temperature TR. The time constant $\tau$ is determined in, for example, four ranges such as a first range r1 in which the inside air temperature TR is equal to or less than 20° C., a second range r2 in which the inside temperature TR is between 25° C. and 21° C., a third range r3 in which the inside air temperature TR is between 30° C. and 26° C. and a fourth range r4 in which the inside air temperature TR is equal to or more than 31° C. The time constant $\tau$ is determined in relation to change in the elevation angle $\theta$ of the sunlight in respective ranges r1 to r4.

The temperature feeling of the passenger sensitively changes when an ambient temperature, i.e., the inside-air temperature TR is increased. Therefore, the time constant $\tau$ is lowered when the inside air temperature TR rises.

Figure 4:
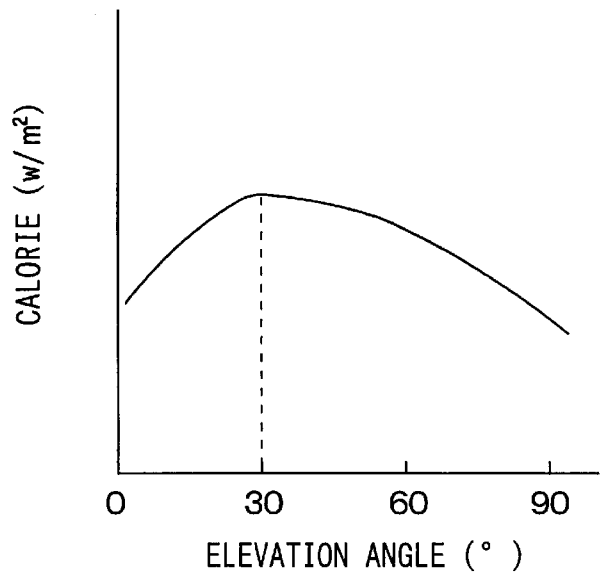
FIG. 4 is a diagram showing a relationship between an amount of a received calorie by the sunlight and a sunlight elevation angle θ in the first embodiment of the present invention.

As shown in FIG. 4, the amount of received calories of the sunlight is maximum at around 30° of the elevation angle which is relatively small. Moreover, the sunlight reaches directly to a face portion of the passenger through the window glass of the vehicle when the elevation angle $\theta$ is low like 30°. In this situation, the temperature feeling of the passenger changes rapidly in a short time.

In taking account the above-described fact, the time constant $\tau$ is minimum at around 30° in every range r1 to r4 for the inside air temperature. While the elevation angle $\theta$ is increased from the angle around 30°, the change in the temperature feeling of the passenger with respect to the change in the amount of sunlight is gradually less sensitive since the amount of the sunlight directly incident to the face portion of the passenger is decreased gradually. Namely, the change in the temperature feeling of the passenger with respect to the change in the amount of sunlight takes some time. Therefore, the time constant $\tau$ is increased gradually in every range r1 to r4 for the inside air temperature while the elevation angle $\theta$ is increased from the angle around 30°.

However, a degree in the increase of the time constant $\tau$ according to the increase of the elevation angle $\theta$ is decreased according to the increase of the inside air temperature TR. This is because the temperature feeling of the passenger changes to cause a hot feeling in a short time with a slight change in the sunlight amount. As a result, in the range r4 in which the inside air temperature is the highest, i.e., 31° C. or more, the time constant $\tau$ is increased very slightly even when the elevation angle $\theta$ is increased. The time constant $\tau$ in the range r4 is kept at a small value lower than 40 seconds even though the elevation angle $\theta$ is increased as shown in FIG. 3.

On the other hand, in the range r1 in which the inside air temperature is the lowest, i.e., 20° C. or less, the time constant $\tau$ is increased dynamically so as to be increased from the minimum value around 40 seconds to a maximum value around 180 seconds since the change in the temperature feeling of the passenger with respect to the change in the amount of sunlight is less sensitive with the increase of the elevation angle $\theta$.

In the next step 160, the time constant process is performed with respect to the detected value (pure value) obtained from the sunlight amount sensor 41 by using the following equation (1).

$$TSnew = (1/a) \times TS + \{(a-1)/a\} \times TSold \quad (1)$$

Wherein TSnew is the sunlight amount obtained after the time constant process is performed, TS is the current detected value (pure value) at the sunlight amount sensor 41 read at step S120, TSold is the previous sunlight amount after the time constant process was performed, and "a" is a value corresponding to a formula of (time constant $\tau$/control cycle "t"). The time constant $\tau$ is determined at step S150 described above, and the control cycle t is a waiting time in the following step S230. The step S160 denotes time constant process means in this invention.

In next step S170, a target blowing temperature TAO of the air blown into the passenger compartment is calculated according to the signals indicative of the environmental conditions and the preset temperature TSET that are read out at the step S110 and S120 by using the following equation 2. The TAO is a necessary air blowing temperature for keeping the passenger compartment at the control preset temperature TSET regardless of change in the environmental condition (the heat load condition of the vehicle).

$$TAO = KSET \times TSET - KR \times TR - KAM \times TAM - KS \times TS + C \quad (2)$$

Wherein KSET, KR, KAM and KS represent coefficients, and C represents a correction constant. TSET, TR, TAM, TS represent the control preset temperature, the inside air temperature, the outside air temperature, the sunlight amount as described above, respectively. Moreover, the sunlight amount TSnew, which is obtained by the time constant process at step S160, is employed as the sunlight amount TS in the above-described equation 2.

In next step S180, a blower voltage for determining the blowing air amount is determined in accordance with the TAO obtained from the above-described equation (1). As well known, the blower voltage changes in multistage in connection with change in the TAO. Also, the blower voltage has a maximum value at a lower temperature side and higher temperature side of the TAO, and has a medium value therebetween.

Next, a target opening degree SW of the air mix door 18 is calculated according to the following equation (3) with respect to the TAO.

$$SW = ((TAO - TE)/(TW - TE)) \times 100 (\%) \quad (3)$$

In next step S200, the inside/outside air suction mode, which is adjusted by the inside/outside-air switching door 12, is determined according to the TAO. Namely, while the TAO changes from the lower temperature side to the higher temperature side, the suction mode changes from an inside-air mode to an outside-air mode through a half-inside-air mode, or changes directly from the inside-air mode to the outside-air mode without going through the half-inside-air mode.

In next step S210, the blow-out mode, which is achieved with the blow-out mode doors 20, 22 and 24, is determined according to the TAO. Namely, while the TAO changes from the lower temperature side to the higher temperature side, the blower mode changes from the FACE mode to the FOOT mode through the BI-LEVEL mode.

In next step S220, an activation in each actuator 12a, 18a and 25 in addition to the revolution rate of the blower motor 14 is controlled by supplying control signals to them through the drive circuit 32 that are obtained at each step S180 to S210.

In next step S230, it is determined whether or not time t has passed that represents a control cycle of the air conditioning. When the time t has passed, the flow restarts from the step S110.

The sunlight amount TS is used for calculating the target blowing temperature TAO as a basic target value in the equation (2) as described above. Moreover, the sunlight amount TSnew, which is obtained after the time constant process is performed in step S160, is used as the TS in the equation instead of the detected value obtained at the sunlight amount sensor 41 to make the air-conditioning, based on the TAO, stable.

In this embodiment, the time constant $\tau$ is not a fixed value, but is variable in connection with both of the elevation angle $\theta$ of the sunlight and the inside air temperature TR determined in the control map shown in FIG. 3. As described above, the degree (speed) in time-rate change of the change in the temperature feeling of the passenger with respect to change in the sunlight amount is influenced by the change in the inside air temperature TR in addition to the elevation angle $\theta$. Therefore, the time constant $\tau$ is determined so as to be matched with the actual change in the temperature feeling of the passenger in this embodiment.

As a result, the air-conditioning which follows the actual change in the temperature feeling of the passenger, such as the control in the blow-out temperature of the air blown into the passenger compartment, the control in the blow-out amount of the air blown into the passenger compartment or the like, can be achieved. Accordingly, the air-conditioning feeling can be improved.

In the above-described embodiment, the navigation system 44 is employed to obtain the current position of the vehicle (latitude and longitude), the traveling direction of the vehicle, the calendar information and the like so that the elevation angle $\theta$ of the sunlight, which is incident into the vehicle, can be calculated using the result of calculation for the sun position with respect to the vehicle. However, the elevation angle $\theta$ can be obtained, for example, using a sunlight amount sensor having three sunlight-sensitive portions as disclosed in JP-A-S56-64611 without using the navigation system.

Moreover, the navigation system 44 and the air conditioning control device 30 may be consolidated in a single control unit (ECU).

Moreover, a sunlight sensor can be provided in each passenger seat for independently controlling the air-conditioning of each seat using the time constant process described above in connection with the detected signal from each sunlight amount sensor.

Instead of the inside air temperature, for example, a skin temperature of the passenger detected using an infrared sensor can be used as an inside temperature of the vehicle for determining the time constant $\tau$ and/or for calculating the TAO. Namely, a temperature value denoting the temperature feeling of the passenger in the vehicle can be used as the inside temperature of the vehicle.

While the present invention has been shown and described with reference to the foregoing preferred embodiment, it will be apparent to those skilled in the art that changes in form and detail may be therein without departing from the scope of the invention as defined in the appended claims.

What is claimed is:

1. A vehicle air conditioner having automatic control, comprising:
   a sunlight sensor for detecting an amount of sunlight incident into a vehicle;
   a control portion for automatically controlling air-conditioning of a passenger compartment of a vehicle using information relating to said sunlight sensor, said control portion including time constant means for processing a signal detected by said sunlight sensor using a time constant, wherein:
   said time constant is determined in accordance with an elevation angle of the sunlight incident into the vehicle and an inside temperature in the vehicle.

2. A vehicle air conditioner having automatic control according to claim 1, wherein a target blowing temperature of air blown into the passenger compartment is calculated according to a calculated value after the time constant process is performed, and the air-conditioning of the vehicle is controlled in association with the calculated value.

3. A vehicle air conditioner having automatic control according to claim 1, further comprising an inside air temperature sensor for detecting a temperature of air inside the vehicle.

4. A vehicle air conditioner having automatic control according to claim 1, further comprising an elevation determining portion for determining said elevation angle.

5. A vehicle air conditioner having automatic control according to claim 4, wherein said elevation determining portion is a vehicle navigation system.

6. A vehicle air conditioner having automatic control according to claim 1, wherein said time constant is decreased in accordance with an increase of said inside temperature.

7. A vehicle air conditioner having automatic control according to claim 6, wherein said time constant is minimum at a predetermined value of the elevation angle at which an amount of received calories by the sunlight of the passenger is maximum, and said time constant, which is determined in connection with the increase of the inside temperature, is increased in accordance with an increase of the elevation angle at a range in which the elevation angle is larger than the predetermined value.

8. A vehicle air conditioner having automatic control according to claim 7, wherein a degree in the increase of the time constant in response to the increase of the elevation angle of the sunlight is decreased in accordance with the increase of the inside temperature.

9. A vehicle air conditioner having automatic control according to claim 1, wherein said time constant has a characteristic including a curve which has an inflection point between a minimum value and a maximum value of said elevation angle when said characteristic is shown in a diagram in which said elevation angle denotes a horizontal axis and said time constant denotes a vertical axis so that said curve rises larger in a range in which the elevation angle is smaller than the predetermined value having the inflection point than in a range in which the elevation angle is larger than a predetermined value.

* * * * *